United States Patent [19]

Benoit et al.

[11] 4,433,590

[45] Feb. 28, 1984

[54] ANTI-BACKLASH NUT ASSEMBLY

[75] Inventors: Harold P. Benoit; Leonard J. LaPasso; Ian McBain, all of Rockford, Ill.

[73] Assignees: Motion Control, Inc.; Rockford Ball Screw Co., both of Rockford, Ill.

[21] Appl. No.: 297,222

[22] Filed: Aug. 28, 1981

[51] Int. Cl.³ ............................................. F16H 55/18
[52] U.S. Cl. ...................................... 74/409; 74/411
[58] Field of Search .............................. 74/441, 409

[56] References Cited

U.S. PATENT DOCUMENTS

| 2,690,682 | 10/1954 | Passman | 74/441 |
| 3,001,414 | 9/1961 | Bourne | 74/441 |
| 3,121,340 | 2/1964 | Anthony | 74/459 |
| 3,720,116 | 3/1973 | Better et al. | 74/459 |
| 3,977,260 | 8/1976 | Linley, Jr. | 74/86 |
| 4,071,866 | 1/1978 | Butsch | 74/409 |
| 4,131,031 | 12/1978 | Erikson et al. | 74/409 |
| 4,279,173 | 7/1981 | Krebs et al. | 74/441 |
| 4,353,264 | 10/1982 | Erikson et al. | 74/441 |

FOREIGN PATENT DOCUMENTS 804961 2/1981 U.S.S.R. ................... 74/409

Primary Examiner—Lawrence J. Staab
Assistant Examiner—Michael David Bednarek
Attorney, Agent, or Firm—Hosier, Niro & Daleiden

[57] ABSTRACT

An anti-backlash nut assembly is disclosed for longitudinal movement along a screw which has an external thread thereon, in response to relative rotational movement between the nut assembly and the screw. The assembly includes a first nut part having an internal thread complementary to the external thread of the screw, and a second nut part also having an internal thread complementary to the external thread of the screw. A coil spring is interconnected between the first and second nut parts for applying torque thereto and rotatably biasing the nut parts together to eliminate backlash therebetween and improve the positional accuracy of the nut assembly along the screw. A cylindrical collar is sandwiched between a pair of opposed portions of the nut parts and surrounds the coil spring. With this structural combination, the anti-backlash nut assembly can be adjustably preloaded by relatively rotating the nut parts to selectively preload the coil spring to a desired torque. The assembly then is rotated onto the screw with the torsion spring so preloaded.

23 Claims, 5 Drawing Figures

ANTI-BACKLASH NUT ASSEMBLY

BACKGROUND OF THE INVENTION

This invention relates to anti-blacklash devices, and particularly to anti-backlash nut assemblies for translational movement along a screw in response to relative rotational movement between the nut assembly and screw.

There are many applications in which it is important to drive an element in a machine or apparatus along a screw which provides substantially accurate positional repeatability and constant drag torque control. For example, such a driven element might be used in apparatus for recording, printing, winding, actuating and lifting, or like purposes.

However, should there be an imperfect fit between two members, such as a lead screw and a threaded nut, which are cooperating to transmit movement from one of the members to the other, any resulting slack between the members causes "backlash". If the lead screw is rotated about its longitudinal axis while the nut is prevented from rotating whereby translational movement of the nut longitudinally of the screw is effected, when the direction of rotation of the screw is reversed the direction of movement of the nut is not immediately reversed. This is due to the slack between the cooperating threads of the nut and screw. The slack must be taken up before the nut starts to move in the reverse direction.

This slack or backlash cannot be practically overcome by making a better fit between the screw and nut because this would increase friction and wear, with the result that slack soon appears between the members.

Thus, the term "anti-backlash" has been used in the art to designate devices or arrangements which include means for overcoming or reducing the slack between cooperating members, such as a lead screw and a threaded nut, for the purpose of reducing backlash.

Various attempts have been made to provide anti-backlash devices, such as anti-backlash nut assemblies, for overcoming or reducing the slack between lead screws and threaded nuts. Some such prior devices have included employing a compression spring between a pair of axially split nut portions, employing electromagnetic means the energization of which causes relative movement between nut parts so that the slack therebetween is reduced or varied, and providing springs which actually seat in the thread grooves of the lead screw and/or nut themselves. An anti-backlash nut assembly also has been proposed which utilizes an axially and resiliently deformable intermediate section between a pair of nut parts, the deformable intermediate section being rigid in torsion and sheer for axially spreading the nut portions.

The present invention is designed for providing a new and improved anti-backlash nut assembly for overcoming or reducing the slack between cooperating members, such as a lead screw and threaded nut, for the purpose of reducing backlash.

SUMMARY OF THE INVENTION

An object, therefore, of the present invention is to provide a new and improved anti-backlash device.

Another object of the invention is to provide an anti-backlash device in the form of an anti-backlash nut assembly for translational movement along a lead screw.

A further object of the present invention is to provide an anti-backlash nut assembly of the character described, having spring means which can be preloaded to vary the anti-backlash forces within the nut assembly.

In the exemplary embodiment of the invention, an anti-backlash nut assembly is designed for longitudinal movement along a lead screw which has an external thread thereon, in response to relative rotational movement between the nut assembly and screw. First and second nut parts are provided with internal threads complementary to the external thread of the screw. Torsion means is interconnected between the first and second nut parts for rotatably biasing the nut parts to eliminate slack or backlash therebetween and improve the positional accuracy of the nut assembly along the screw.

As disclosed herein, the torsion means comprises a coil spring interconnected between the first and second nut parts for applying opposing torque forces between the nut parts. The opposite ends of the coil spring each are affixed to a respective one of the nut parts.

A cylindrical collar is sandwiched between a pair of opposed shoulder portions of the nut parts and surrounds the coil spring.

This new, improved and novel structural combination affords a method of assembling and adjustably preloading the anti-backlash nut assembly to a predetermined or desired torque. More particularly, by relatively rotating the two nut parts prior to assembly onto the lead screw, the torque of the coil spring can be adjusted to a greater or lesser degree. Thus the amount of preload forces within the anti-backlash nut assembly can be controlled.

Other objects, features and advantages of the invention will be apparent from the following detailed description taken in connection with the accompanying drawings.

DESCRIPTION OF THE DRAWINGS

The features of this invention which are believed to be novel are set forth with particularly in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Figure 1:
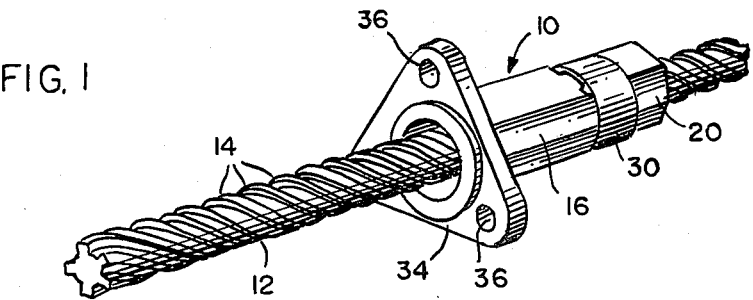
FIG. 1 is a perspective view illustrating an anti-backlash nut assembly according to the present invention, positioned on an externally threaded lead screw.
Figure 2:
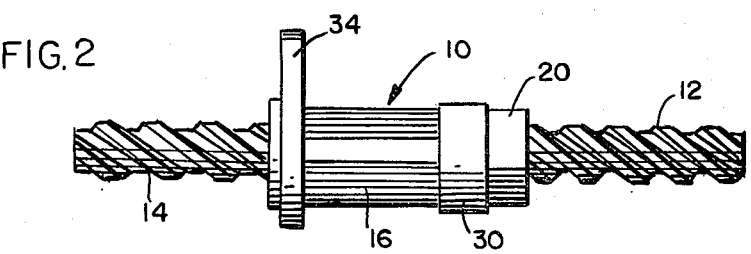
FIG. 2 is a side elevational view illustrating the anti-backlash nut assembly and lead screw of FIG. 1.

Referring to the drawings in greater detail, and first to FIGS. 1 and 2, an anti-backlash nut assembly is illustrated in accordance with the present invention as generally designated 10. The anti-backlash nut assembly is designed for longitudinal movement along a lead screw, generally designated 12, which has an external thread 14 thereon. The nut assembly is translationally moved along the screw in response to relative rotational movement between the nut assembly and screw.

The anti-backlash nut assembly 10 of the present invention includes a first nut part 16 having an internal thread 18 (FIG. 3) complementary to the external thread 14 of screw 12. A second nut part 20 also has an internal thread 22 (FIG. 3) complementary to the external thread 14 of screw 12.

Figure 3:
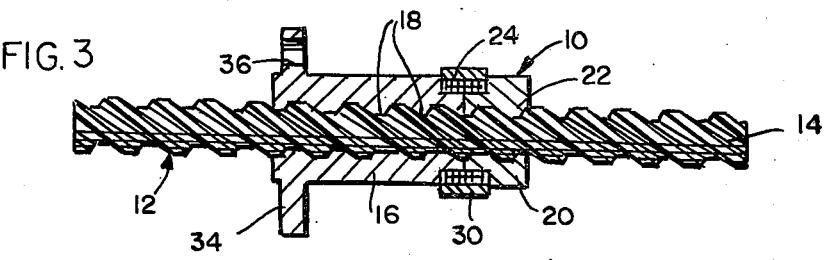
FIG. 3 is a longitudinal, central sectional view through the anti-backlash nut assembly, with the lead screw in elevation.
Figure 4:
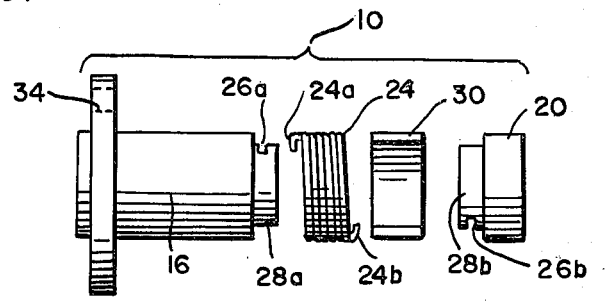
FIG. 4 is a side elevational view of the anti-backlash nut assembly of the present invention, shown exploded or in a disassembled condition.
Figure 5:
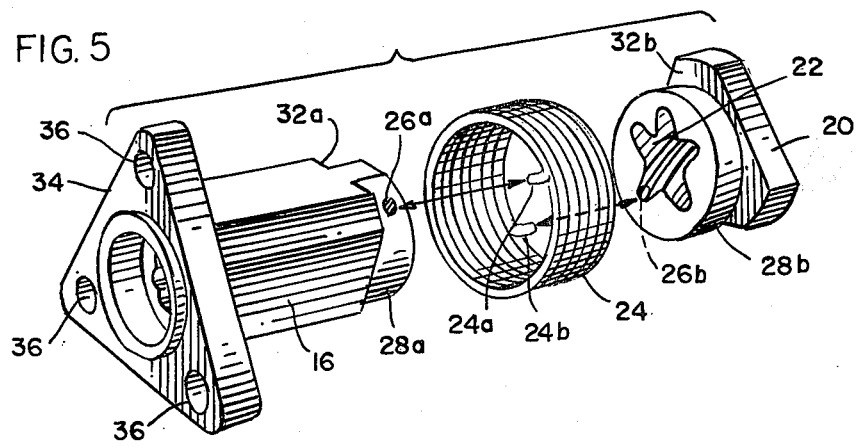
FIG. 5 is a perspective view, on an enlarged scale, of the two nut parts and torsion spring of the anti-backlash nut assembly of this invention.

Referring to FIGS. 3–5, anti-backlash nut assembly 10 also includes torsion means in the form of a coil spring 24 interconnected between the first and second nut parts 16 and 20, respectively, for rotatably biasing the nut parts together to eliminate backlash therebetween and improve the positional accuracy of nut assembly 10 along screw 12. The coil spring applies opposing torque forces to nut parts 16, 20, relatively rotating and holding the two nut parts together, for overcoming or reducing the slack therebetween for the purpose of reducing backlash.

In order to interconnect torsion spring 24 between the two nut parts 16, 20, opposite ends of the spring are bent radially inwardly to form securing tangs 24a and 24b. These tangs 24a and 24b are adapted for positioning in holes or bores 26a and 26b, respectively, formed in reduced sections 28a and 28b, respectively, of the first and second nut parts 16 and 20, respectively. The cylindrical reduced sections 28a, 28b protrude inwardly of torsion spring 24 as best seen in FIG. 3. The internal threads of the nut parts extend axially, completely therethrough and through the reduced sections 28a, 28b.

A cylindrical collar 30 is provided for surrounding torsion spring 24, again as best seen in FIG. 3. This collar provides a dust shield and protects against foreign objects from becoming tangled within the coils of torsion spring 24. The collar surrounds the reduced cylindrical sections 28a, 28b of the nut parts and is axially positioned by abutment against shoulders 32a and 32b of nut parts 16 and 20, respectively.

It can be seen that nut part 16 is a large dimensioned member and is provided with securing means in the form of a flange 34 having bores 36 for securing an operative component thereto for driving the component therewith longitudinally or translationally along screw 12. Nut part 20 is a smaller dimensioned member and is readily manipulatable to facilitate preloading the anti-backlash nut assembly of the present invention either during or prior to assembly onto the lead screw.

More particularly, the anti-backlash nut assembly of the present invention affords a method of assembly and adjustably preloading the assembly to adjust the torque applied to the nut parts by torsion spring 24. This is accomplished by relatively rotating the nut parts to a greater or lesser degree while torsion spring 24 is interconnected thereto and prior to full assembly onto the lead screw. This relative rotation or relative rotational positioning of the nut parts controls and determines the amount of preload torque force applied by the torsion spring to the nut parts when rotatably positioned on the lead screw. In practice, the larger nut part 16 can be threaded onto one end of lead screw 12 without engagement by the internal threads 22 of the smaller nut part 20. In this initial threaded engagement with the lead screw, nut part 20 then can be rotated while holding nut part 16 stationary, until a desired amount of preload force is built up in torsion spring 24. The smaller nut part then can be moved into threaded engagement with the end of the lead screw and the torsion spring will maintain this controlled, predetermined torque force between the two nut parts.

The anti-backlash nut assembly 10 of the present invention has been fabricated by making nut parts 16 and 20 of plastic material, as well as fabricated protective collar 30 of plastic. Torsion spring 24 has been fabricated of metal, and the nut assembly has been utilized on a standard lead screw which can be rolled, ground or machined with its external threads. Of course, other appropriate materials are contemplated.

Thus, it can be seen that a new and improved anti-backlash nut assembly has been provided for longitudinal or translational movement along a lead screw in response to relative rotational movement between the nut assembly and screw, along with a novel means for preloading the assembly with torsion forces to eliminate backlash and improve the positional accuracy of the nut assembly along the screw.

It will be understood that the invention may be embodied in other specific forms without departing from the spirit or central characteristics thereof. The present examples and embodiments, therefor, are to be considered in all respects as illustrative and not restrictive, and the invention is not to be limited to the details given herein.

We claim:

1. An anti-backlash nut assembly for longitudinal movement along a screw which has an external thread thereon, in response to relative rotational movement between the nut assembly and screw, comprising:
   a first nut part having an internal thread complementary to the external thread of said screw;
   a second nut part also having an internal thread complementary to the external thread of said screw; and
   torsion means interconnected between said first and second nut parts for rotatably biasing said nut parts together to eliminate backlash and improve the positional accuracy of the nut assembly along the screw.

2. The anti-backlash nut assembly of claim 1 wherein said torsion means comprises a spring for applying opposing torque to said nut parts.

3. The anti-backlash nut assembly of claim 2 wherein said spring comprises a coil spring with opposite ends thereof each affixed to a respective one of said nut parts.

4. The anti-backlash nut assembly of claim 2, including a collar surrounding said spring.

5. The anti-backlash nut assembly of claim 4 wherein said collar is freely movable relative to said spring and said nut parts.

6. The anti-backlash nut assembly of claim 5, including means on said nut parts for positioning said collar about said spring.

7. The anti-backlash nut assembly of claim 6 wherein said last name means comprises opposed abutment shoulders on said nut parts for engaging opposite ends of said collar.

8. An anti-backlash nut assembly for longitudinal movement along a screw which has an external thread thereon, in response to relative rotational movement between the nut assembly and screw, comprising:

a first nut part having an internal thread complementary to the external thread of said screw;

a second nut part also having an internal thread complementary to the external thread of said screw;

a coil spring interconnected between said first and second nut parts for applying opposing torque forces to said nut parts and rotatably biasing said nut parts together to eliminate backlash and improve the positional accuracy of the nut assembly along the screw, the opposite ends of said coil spring each being affixed to a respective one of said nut parts; and a collar sandwiched between a pair of opposed portions of said nut parts and surrounding said coil spring.

9. The anti-backlash nut assembly of claim 8 wherein said collar is cylindrical and freely rotatable relative to said coil spring and said nut parts.

10. The anti-backlash nut assembly of claim 8 wherein one of said nut parts has means for securing an operative component thereto for driving the component therewith longitudinally of said screw.

11. The anti-backlash nut assembly of claim 10 wherein one of said nut parts is a large dimensioned member having said securing means thereon, and the other of said nut parts is a small dimensioned member to facilitate preloading said coil spring by relative rotational positioning of said nut parts prior to assembly onto one end of said screw.

12. The anti-backlash nut assembly of claim 8 wherein said opposite ends of said coil spring are bent radially inwardly and are received in radial bores in said respective nut parts.

13. A method of assembling and adjustably preloading an anti-backlash nut assembly for longitudinal movement along a screw which has an external thread thereon, in response to relative rotational movement between the nut assembly and screw, comprising:

providing a first nut part having an internal thread complementary to the external thread of said screw;

providing a second nut part also having an internal thread complementary to the external thread of said screw;

providing a torsion spring interconnected between said nut parts to bias said nut parts together;

relatively rotating said nut parts to preload said torsion spring to a desired torque; and assembling said nut parts onto said screw with said torsion spring so preloaded to eliminate backlash and improve the positional accuracy of the nut assembly along the screw.

14. An anti-backlash nut device which may be preloaded onto a screw which has an external thread, comprising:

a first nut part having an internal thread complementary to the external thread of said screw;

a second nut part also having an internal thread complementary to the external thread of said screw; and torsion means interconnected between said first and second nut parts, said torsion means being in a relaxed condition between said nut parts prior to assembly onto said screw whereby the nut parts can be relatively rotated to align the internal threads thereof and to preload said torsion means to bias said nut parts together whereafter the preload device can be placed onto said screw to eliminate backlash and improve the positional accuracy of the nut assembly along the screw.

15. The anti-backlash nut device of claim 14 wherein said torsion means comprises a spring for applying opposing torque to said nut parts.

16. The anti-backlash nut device of claim 15 wherein said spring comprises a coil spring with opposite ends thereof each affixed to a respective one of said nut parts.

17. The anti-backlash nut device of claim 15, including a collar surrounding said spring.

18. The anti-backlash nut device of claim 17 wherein said collar is freely movable relative to said spring and said nut parts.

19. The anti-backlash nut device of claim 18, including means on said nut parts for positioning said collar about said spring.

20. The anti-backlash nut device of claim 19 wherein said last named means comprises opposed abutment shoulders on said nut parts for engaging opposite ends of said collar.

21. The anti-backlash nut device of claim 14 wherein one of said nut parts has means for securing an operative component thereto for driving the component therewith longitudinally of said screw.

22. The anti-backlash nut device of claim 21 wherein one of said nut parts is a large dimensioned member having said securing means thereon, and the other of said nut parts is a small dimensioned member to facilitate preloading said torsion means.

23. The anti-backlash nut device of claim 14 wherein said torsion means comprises a coil spring having opposite ends thereof bent radially inwardly and received in radial bores in said nut parts.

* * * * *